(12) United States Patent
Lee et al.

(10) Patent No.: US 7,369,857 B2
(45) Date of Patent: May 6, 2008

(54) PROCESSING TRANSPORT FORMAT INFORMATION TO PREVENT MAC HEADER REDUNDANCY

(75) Inventors: Young Dae Lee, Hanam (KR); Seung June Yi, Seoul (KR); Sung Duck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 420 days.

(21) Appl. No.: 11/001,998

(22) Filed: Dec. 1, 2004

(65) Prior Publication Data

US 2005/0190719 A1 Sep. 1, 2005

(30) Foreign Application Priority Data

Dec. 1, 2003 (KR) .............. 10-2003-0086556

(51) Int. Cl.
*H04Q 7/20* (2006.01)
(52) U.S. Cl. .............. 455/450; 370/395.6; 370/395.64
(58) Field of Classification Search ..... 455/450–452.1; 370/395.53, 395.6, 395.64
See application file for complete search history.

(56) References Cited

U.S. PATENT DOCUMENTS 6,850,540 B1* 2/2005 Peisa et al. ............. 370/468

| | | |
|---|---|---|
| 2001/0043576 A1 | 11/2001 | Terry |
| 2002/0093928 A1 | 7/2002 | Logalbo |
| 2003/0074476 A1 | 4/2003 | Kim et al. |
| 2004/0228313 A1* | 11/2004 | Cheng et al. ....... 370/342 |

FOREIGN PATENT DOCUMENTS

EP    0 991 208 A2    4/2000

* cited by examiner

*Primary Examiner*—Edward F. Urban
*Assistant Examiner*—Raymond S. Dean
(74) *Attorney, Agent, or Firm*—Lee, Hong, Degerman, Kang & Schmadeka

(57) ABSTRACT

Processing transport format information to prevent MAC header redundancy, by providing a transmitting side that attaches one header to received data blocks, transmits the data blocks with the header attached thereto during one transmission interval on a data channel, and further transmits information about the size of each data block and the total size of the data blocks during a time interval corresponding to the transmission interval on a control channel, and by providing a receiving side that performs procedures corresponding to those of the transmitting side.

18 Claims, 10 Drawing Sheets

PROCESSING TRANSPORT FORMAT INFORMATION TO PREVENT MAC HEADER REDUNDANCY

CROSS-REFERENCE TO RELATED APPLICATIONS

The present application claims the benefit of Korean Patent Application No. 10-2003-0086556, filed Dec. 1, 2003, the disclosure of which is incorporated herein by reference.

FIELD OF THE INVENTION

The present invention relates to wireless (radio) communications, and more particularly, to processing transport format information to prevent MAC header redundancy.

BACKGROUND AND SUMMARY

The present invention relates to effectively using radio resources in a UMTS (Universal Mobile Telecommunications System), which is a European type IMT-2000 system, and more particularly, to techniques employed at the transmitting side (transmitter) to configure the size information of data to be received by the receiving side (receiver), and how much size information is to be transmitted.

The UMTS (Universal Mobile Telecommunications System) is a third generation mobile communications system that evolved from the European GSM (Global System for Mobile Communications) system, with the purpose of providing further improved mobile communications service based upon a GSM core network and W-CDMA (Wideband Code Division Multiple Access) technology.

FIG. 1 depicts a typical UMTS network (100) architecture. The UMTS broadly consists of user equipment (UE 110), a UMTS Terrestrial Radio Access Network (UTRAN 12), and a core network (CN 130). The UTRAN consists of one or more radio network sub-systems (RNS 121, 122), and each RNS consists of one radio network controller (RNC 123, 124) and one or more base stations (Node Bs 125, 126) that are managed by the RNC. The Node B, being managed by the RNC, receives data sent from a physical layer of the UE via the uplink and transmits data to the UE via the downlink, to thus act as an access point of the UTRAN with respect to the UE. The RNC handles the allocation and management of radio resources, and acts as an access point with the CN.

FIG. 2 depicts a radio interface protocol architecture based upon a 3GPP radio access network specification between the UE and the UTRAN. The radio interface protocol of FIG. 2 is divided horizontally into a physical layer, a data link layer, and a network layer, and is divided vertically into a user plane for data transmissions and a control plane for transfer of control signaling. Namely, the user plane is the region in which traffic information of the user (such as voice, IP (Internet Protocol) packets and the like) is transferred, while the control plane is the region in which control information (such as the interface of the network, maintaining and managing calls, and the like) is transferred. The protocol layers of FIG. 2 may be divided into a first layer (L1), a second layer (L2), and a third layer (L3) based upon the lower three layers of an open system interconnection (OSI) model that is well-known in communications systems.

Each layer depicted in FIG. 2 will now be described in more detail. The first layer (L1) is a physical layer (PHY) that provides information transfer service to upper layers by using various radio transmission techniques, and is connected to a medium access control (MAC) layer that is located thereabove via a transport channel through which data travels between the MAC layer and the physical layer. In particular, the data blocks delivered between the MAC layer and physical layer via the transport channel are called transport blocks.

The MAC layer provides services to a radio link control (RLC) layer, which is an upper layer, via a logical channel. In general, when information of the control plane is transmitted, a control channel is used. When information of the user plane is transmitted, a traffic channel is used.

The MAC layer is sub-divided into a MAC-b sub-layer, a MAC-d sub-layer, a MAC-c/sh sub-layer, and a MAC-hs sub-layer, according to the type of transport channel that is managed.

The MAC-b sub-layer manages a BCH (Broadcast Channel), which is a transport channel handling the broadcasting of system information.

The MAC-d sub-layer manages a dedicated channel (DCH), which is a dedicated transport channel for a specific terminal. Accordingly, the MAC-d sub-layer of the UTRAN is located in a serving radio network controller (SRNC) that manages a corresponding terminal, and one MAC-d sub-layer also exists within each UE.

The MAC-c/sh sub-layer manages a common transport channel, such as a forward access channel (FACH) or a downlink shared channel (DSCH), which is shared by a plurality of terminals. In the UTRAN, the MAC-c/sh sub-layer is located in a controlling radio network controller (CRNC), and one MAC-c/sh sub-layer exists for each cell because the channels shared by all UEs within a cell are managed.

The MAC-hs sub-layer manages a HS-DSCH (High-Speed Downlink Shared Channel), which is a shared transport channel that transmits high-speed data on the downlink.

The radio link control (RLC) layer supports reliable data transmissions, and performs a segmentation and concatenation function on a plurality of RLC service data units (RLC SDUs) delivered from an upper layer. When the RLC layer receives the RLC SDUs from the upper layer, the RLC layer adjusts the size of each RLC SDU in an appropriate manner upon considering processing capacity, and then creates certain data units when header information added thereto. The created data units are called protocol data units (PDUs), which are then transferred to the MAC layer via a logical channel. The RLC layer includes a RLC buffer for storing the RLC SDUs and/or the RLC PDUs.

There is a radio resource control (RRC) layer at a lowermost portion of the L3 layer. The RRC layer is defined only in the control plane, and handles the controlling of logical channels, transport channels, and physical channels with respect to establishment, reconfiguration, and release of radio bearers (RBs). The radio bearer service refers to a service that the second layer (L2) provides for data transmission between the terminal and the UTRAN in order to guarantee a predetermined quality of service by the UE and the UTRAN. And in general, the radio bearer (RB) establishment refers to regulating the protocol layers and the channel characteristics of the channels required for providing a specific service, as well as respectively setting substantial parameters and operation methods.

When the RRC layer of a particular UE and that of the UTRAN are connected to allow RRC messages to be sent and receive therebetween, that UE is said to be in RRC connected state. If there is no such connection, that UE is said to be in idle state.

Hereafter, the characteristics of an E-DCH (Enhanced Dedicated Channel) will be explained. The E-DCH is a transport channel used when a particular UE is to transmit high-speed uplink data. To support high-speed uplink data transmission, a MAC-eu sub-layer is located in the MAC of the UTRAN and UE, respectively. The MAC-eu sub-layer of the UE is positioned below the MAC-d sub-layer. The MAC-eu sub-layer of the UTRAN is located in the Node B. The E-DCH is a transport channel that is currently being introduced in 3GPP, and thus its particulars have not yet been agreed upon at this time.

A method of delivering the size information of a transport block from the transmitting side to the receiving side will now be explained. One transport block is delivered via one transport channel in (during) one transmission time interval (TTI). When there is a transport block(s) to be transmitted, the MAC of the transmitting side delivers to the physical layer, one or more transport blocks in units of TTI. The physical layer of the transmitting side performs encoding on the transport blocks received from the MAC, and performs transmission to the physical layer in the receiving side. Here, to aid the physical layer in the receiving side for accurately decoding the encoded data, the transmitting side also transmits to the receiving side, transport format (TF) information together with the encoded data. Upon receiving the TF information transmitted from the transmitting side, the physical layer of the receiving side uses this TF information to perform decoding of the received data and reconfigures the transport blocks. These reconfigured transport blocks are then delivered to the MAC of the receiving side in units of TTI.

The TF information includes the various attributes that one transport channel has. These attributes in the TF information can be divided into two categories, referred to as 'attributes of the semi-static part' and 'attributes of the dynamic part.' The attributes of the semi-static part referred to the TF information that can change slowly because it is transmitted by RRC messages. The attributes of the dynamic part refer to the TF information that can change quickly because it is transmitted by units of TTI or units of radio frames. Here, the attributes of the dynamic part are delivered (transported) by means of a TFCI (Transport Format Combination Indicator). The Transmitting side transmits the TFCI to the receiving side via the control field of the physical channel.

In the related art, transport block size and transport block set size are the representative types of attributes of the dynamic part. Here, a transport block set is defined as a set of transport blocks that are transmitted in a TTI.

As in FIGS. 3, 4A, and 4B, one transport block is defined as one MAC PDU (Protocol Data Unit) that includes a MAC SDU (Service Data Unit) and a MAC header, and one or more transport blocks may be delivered during one TTI. Here, the length of the transport blocks transmitted during one TTI are the same. Thus, the length of the transport block set is a multiple of the length of a transport block.

The RRC performs in advance, the configuration of the set comprising the transport block length values and the transport block set length values through the RRC messages. Thus, each time a transport block is transmitted in units of TTI, the transmitting side selects one transport block length and one transport block set length, among those in the configured set, and delivers these values to the receiving side.

In the related art, each transport block has its own MAC header. One reason for using this scheme is because the transport block length (that includes the MAC header length) is used to inform the TF information. However, in this scheme, if there are two or more transport blocks during one TTI, and the transmitted MAC header contents are the same, the redundancy in MAC header content is problematic. That is, MAC headers having the same content are unnecessarily used redundantly. Thus, the related art suffers from disadvantages due to the waste of radio resources caused by MAC header redundancy.

A gist of the present invention involves the recognition by the present inventors of the drawbacks in the related art.

The present invention provides a transport block transmission method that divides the length of the transport block, to be transmitted from the transmitting side to the receiving side, into a header length and a length of the transport block excluding the header length, and transmits these via respectively different channels or respectively different messages. Also, the header length included in the transport block is fixed, and the header length and the length of the transport block excluding the header length are transmitted with respectively different frequency or regularity.

BRIEF DESCRIPTION OF THE DRAWINGS

The accompanying drawings, which are included to provide a further understanding of the invention, are incorporated in and constitute a part of this application, illustrate embodiment(s) of the invention and together with the description serve to explain the principle of the invention. In the drawings.

DETAILED DESCRIPTION

The present invention is described as being implemented in a W-CDMA mobile communications system. However, the present invention may also be adapted and implemented in communications systems operating under other types of communications. Non-limiting exemplary embodiments of the present invention are depicted in the attached Figures.

Figure 1:
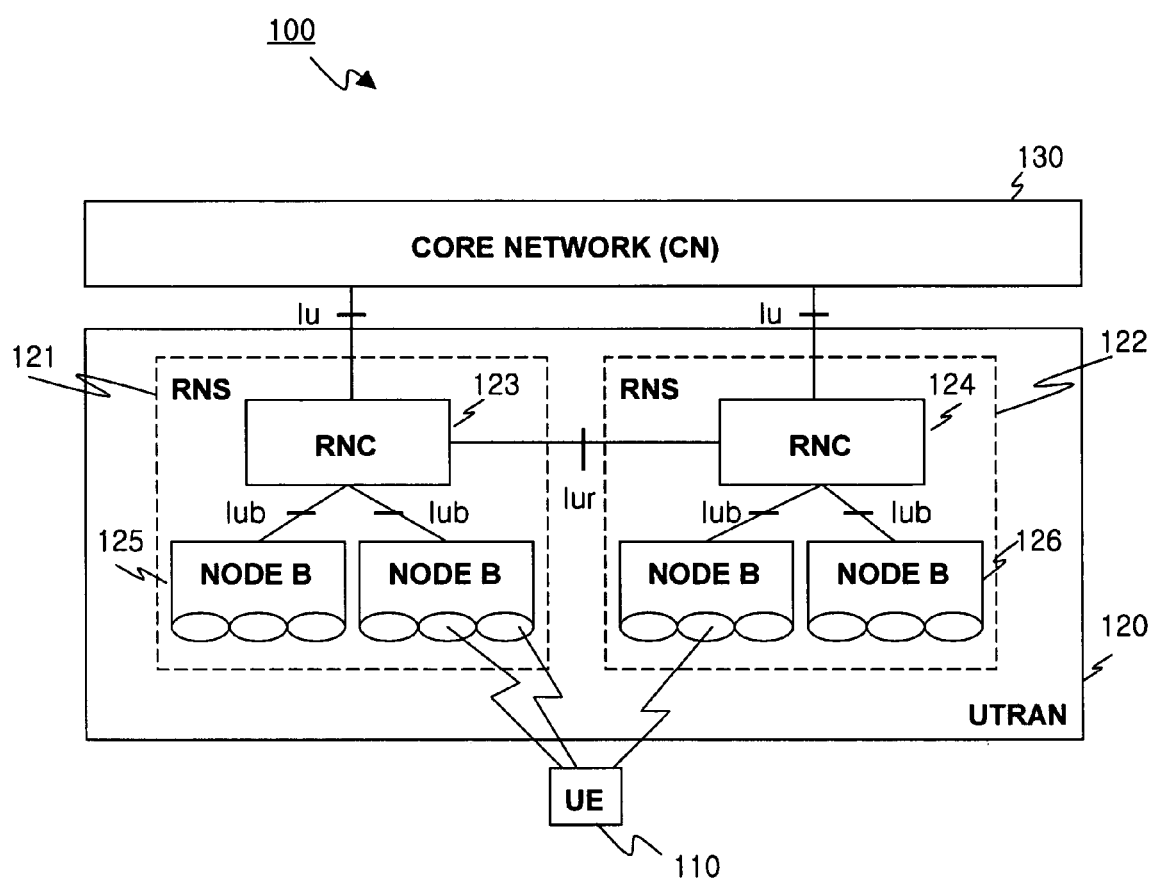
FIG. 1 depicts a general UMTS network architecture.
Figure 2:
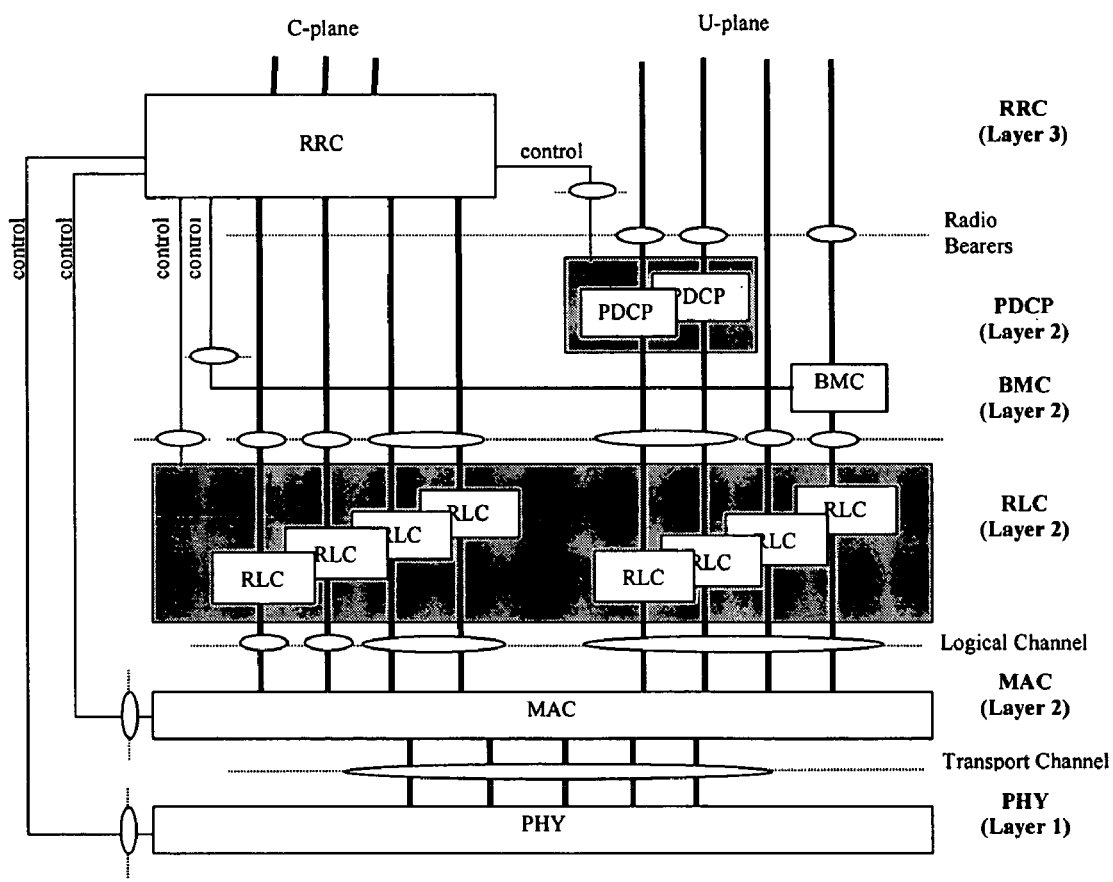
FIG. 2 depicts a radio (wireless) interface protocol structure between the UE and UTRAN based upon the 3GPP radio access network.
Figure 3:
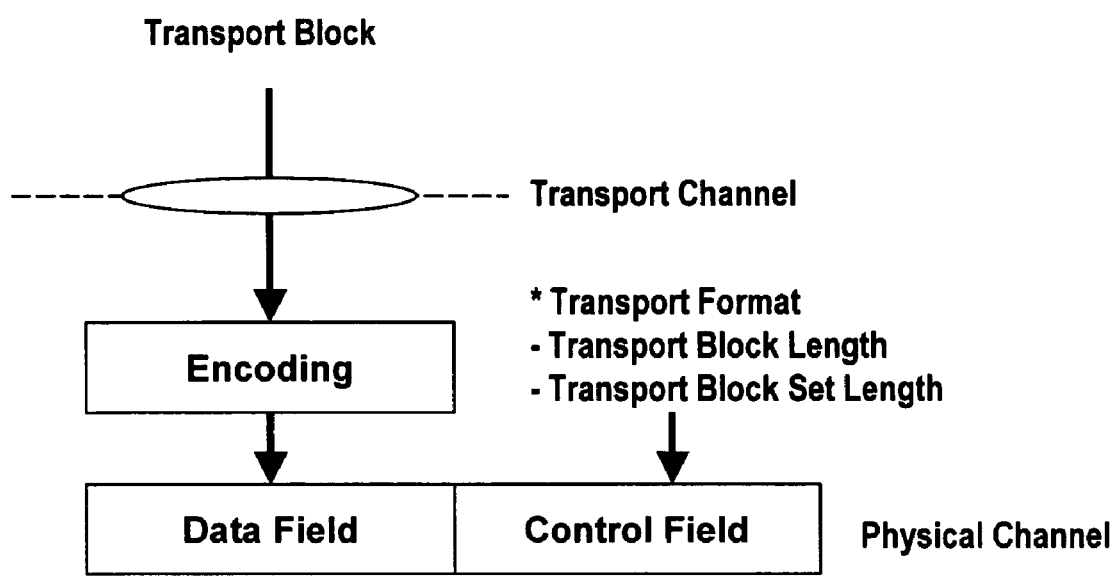
FIG. 3 depicts how a transport block is transmitted during one transmission time interval (TTI) according to the related art.
Figure 4A:
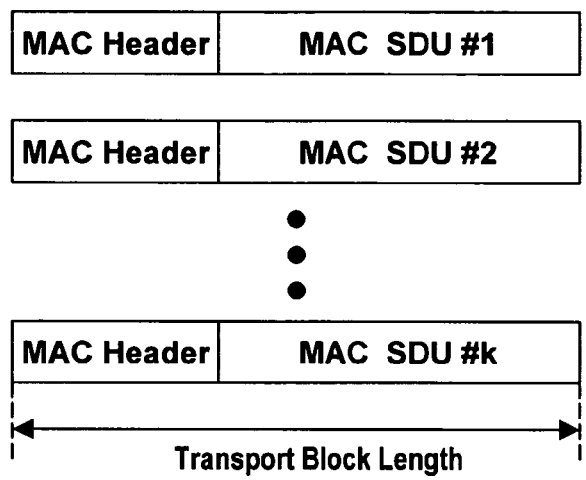
FIG. 4A depicts the definition of a transport block length.
Figure 4B:
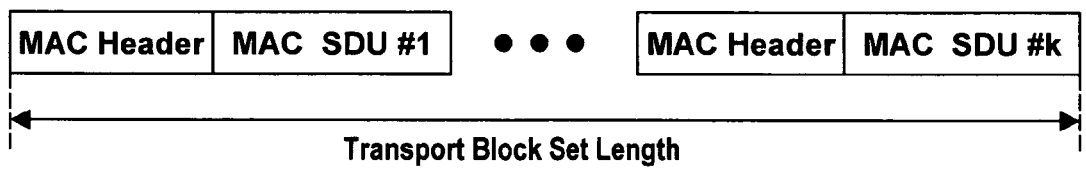
FIG. 4B depicts the definition of a transport block set length.
Figure 5:
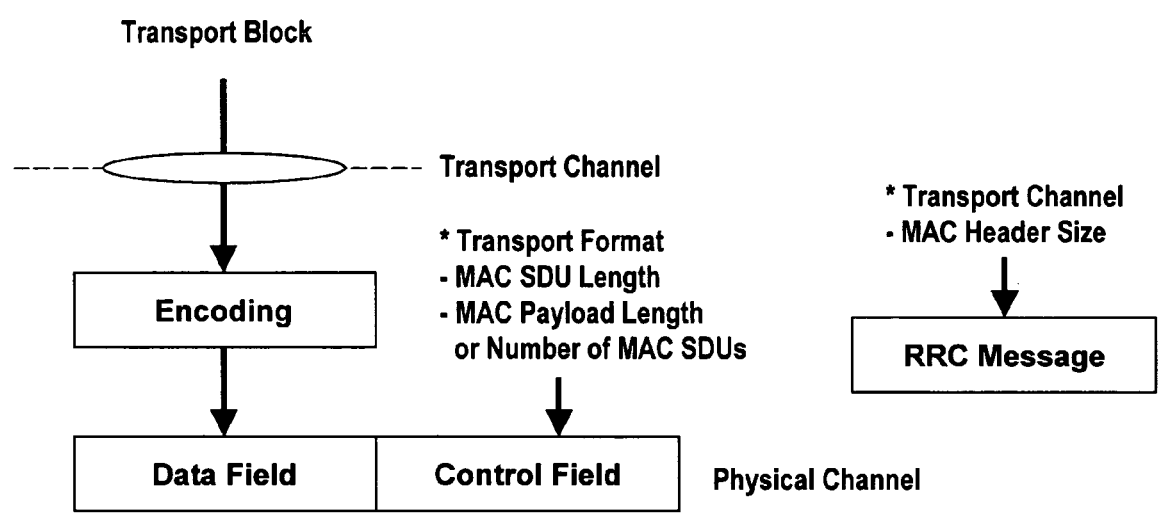
FIG. 5 depicts how a transport block is transmitted according to one embodiment of the present invention.
Figure 6:
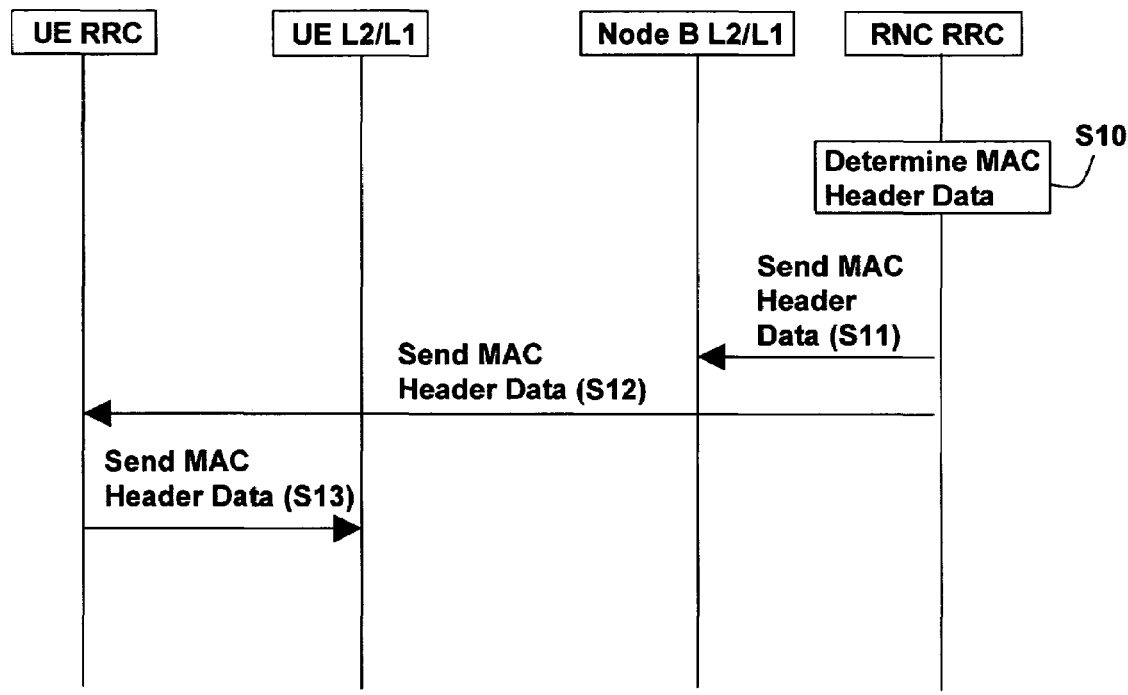
FIG. 6 depicts a method of transmitting MAC header information including the MAC header length according to one embodiment of the present invention.
Figure 7A:
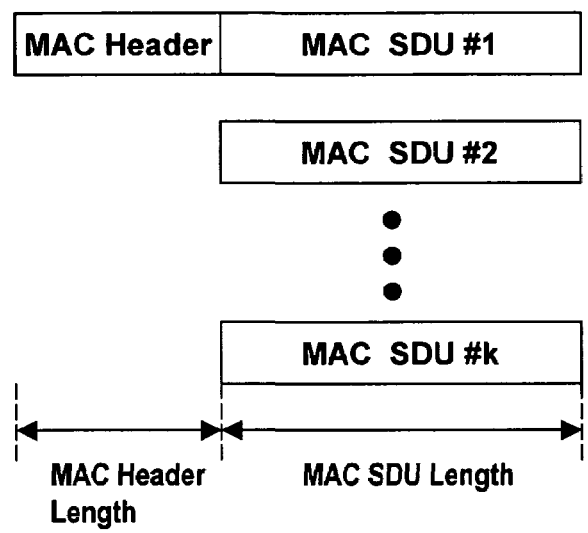
FIG. 7A depicts a MAC header length and a MAC SDU length according to one embodiment of the present invention.
Figure 7B:
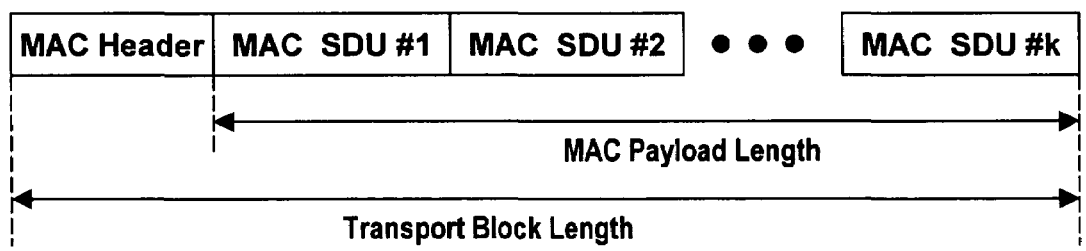
FIG. 7B depicts a MAC payload length and a transport block length according to one embodiment of the present invention.

FIGS. 5 through 7B depict a method of transmitting transport block size information according to one embodiment of the present invention. FIGS. 5 and 6 depict a method of transmitting transport block size information during one TTI according to one embodiment of the present invention. FIG. 7A defines the MAC header size and the MAC SDU size according to one embodiment of the present invention. FIG. 7B defines the MAC payload size and the transport block size according to one embodiment of the present invention.

As shown in FIG. 5, the transmitting side MAC delivers via a transport channel, a transport block to the transmitting side physical layer, which performs encoding of the transport block and delivers to the receiving side using a data field of the physical channel. The transmitting side also includes transport block size information, comprised of MAC SDU size, and MAC payload size, or the number of MAC SDUs, in the transport format (TF) when transmitting to the receiving side. The MAC SDU size, and the MAC payload size or the number of MAC SDUs are delivered to the receiving side by using the control field of the physical channel, while the MAC header size is delivered to the receiving side by using a RRC message. Here, the physical channel used for transmitting transport block size information and the physical channel used for transmitting the transport block may be the same or may be different. All transmitting sides (e.g., all UTRANs) and all receiving sides (e.g., all UEs) that can support the present invention must always store and use the same MAC header size that was agreed upon in advance.

FIG. 6 depicts how MAC header information including the MAC header size is transmitted. The transmitting side forms the MAC header that is included in the transport block, in accordance with the MAC header length that was determined and transferred by the UTRAN. Preferably, the transmitting side can be a terminal, the receiving side can be a Node B, and the MAC header size is sent to the terminal (the transmitting side) via a RRC message.

A shown in FIG. 6, the RNC RRC of the UTRAN first determines the MAC header information to be used by the transmitting side and the receiving side (S10). Here, the determined MAC header information includes the MAC header size (length). Then, the RNC RRC of the UTRAN sends the MAC header information to the L2/L1 layers of the Node B (S11), and also to the RRC of the terminal via a RRC message (S12). The RRC of the terminal sends the received MAC header information to the L2/L1 layers of the terminal (S13).

The Node B and L2/L1 layers of the terminal include a MAC layer and a physical layer therein. Thus, the transmitting side and the receiving side can encode and decode transport blocks in accordance with the MAC SDU size (length), the MAC payload size (length), and the MAC header size (length) determined by the RNC RRC of the UTRAN. Namely, the transmitting side MAC layer generates a transport block by attaching a MAC header to the payload according to instructions from the RNC RRC. The receiving side MAC layer restores the one or more MAC SDUs that comprise the payload of a received transport block according to the MAC header information received from the RNC RRC. Preferably, if the RNC RRC of the UTRAN does not determine the MAC header size (length), all transmitting sides and all receiving sides that support the present invention, namely, all terminals and all UTRANs, can store and use a pre-set fixed MAC header size. Accordingly, the transmitting side and receiving side encode and decode transport blocks in accordance with the MAC SDU size, the MAC payload size, and the pre-set fixed MAC header size.

As shown in FIG. 7A, the MAC header size refers to the MAC header length (that is, the number of bits for the MAC header) that includes control information attached by the corresponding MAC entity, while the MAC SDU size refers to the length of the data unit (that is, the number of bits in the data unit) that was received from an upper layer of the corresponding MAC entity. In other words, the MAC SDU size refers to the length of the PDU of an upper layer of the MAC entity that attaches the MAC header, and corresponds to the length of a RLC PDU or the length of a PDU of another different MAC entity.

As shown in FIG. 7B, the MAC payload size refers to the sum of the lengths of the MAC SDUs delivered in one TTI, and the transport block size refers to the sum of the MAC payload size length and the MAC header size length. If there is only one transport block delivered during one TTI, the transport block size and the transport block set size are the same.

According to the embodiment of the present invention, the receiving side receives the TF containing the MAC SDU size, and the MAC payload size, or the number of MAC SDUs, and adds the MAC payload size or the number of MAC SDUs with the MAC header size to calculate the transport block size or the transport block set size. The receiving side physical layer uses the transport block size or the transport block set size for decoding the received data, and after re-configuring the transport block, the re-configured transport block is delivered to the receiving side MAC entity. The receiving side MAC entity uses the MAC header size, for example, transmitted by way of a RRC message and the MAC SDU size to re-configure one or more MAC SDUs, which are then delivered to an upper entity.

The present invention may be applied to an E-DCH transport channel that transmits high-speed data on the uplink by using the following method. Here, the protocol entity can be a MAC-eu entity.

Figure 8:
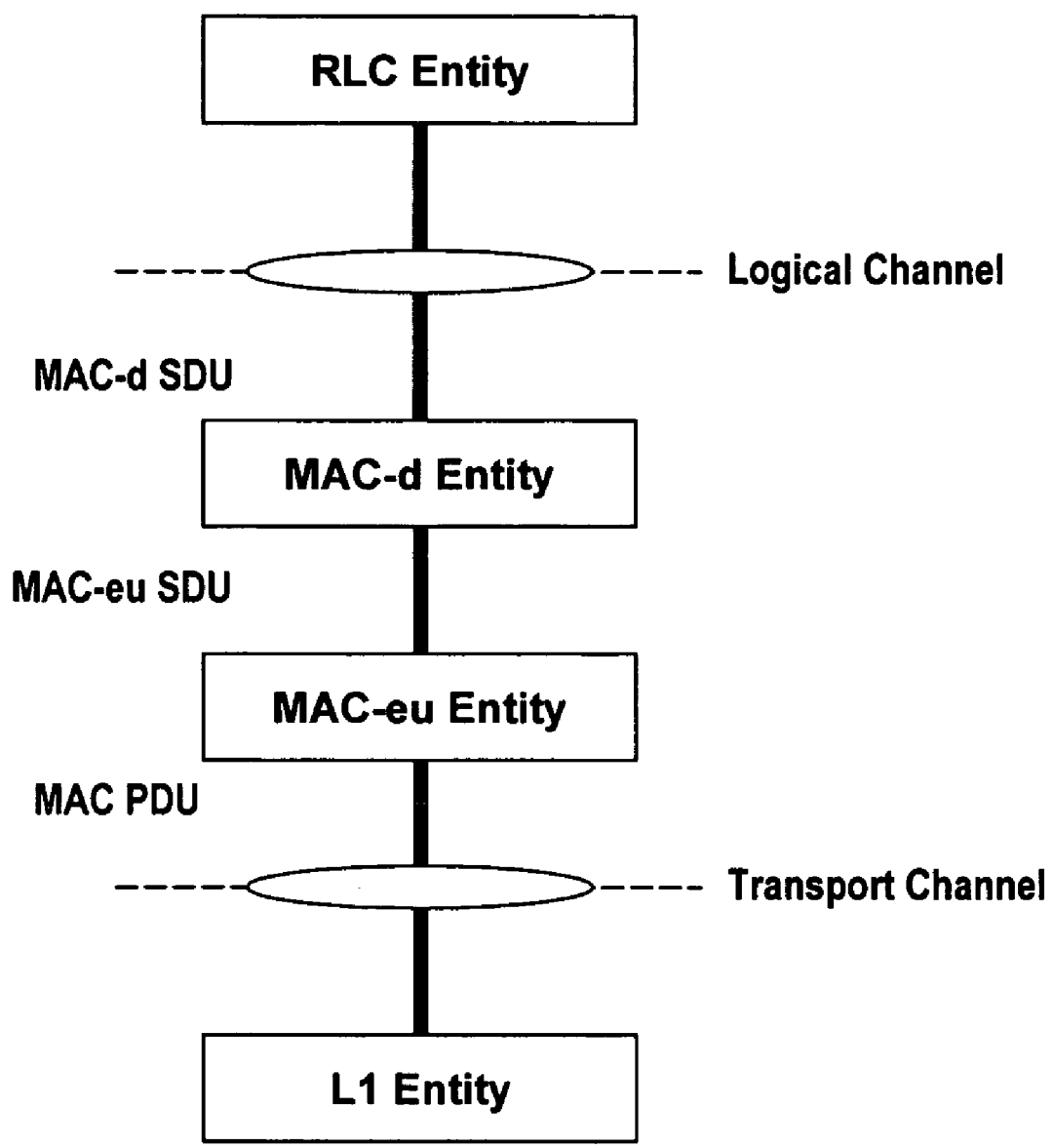
FIG. 8 depicts the structure of a protocol stack for transmitting information of a transport block for a E-DCH according to another embodiment of the present invention.
Figure 9:
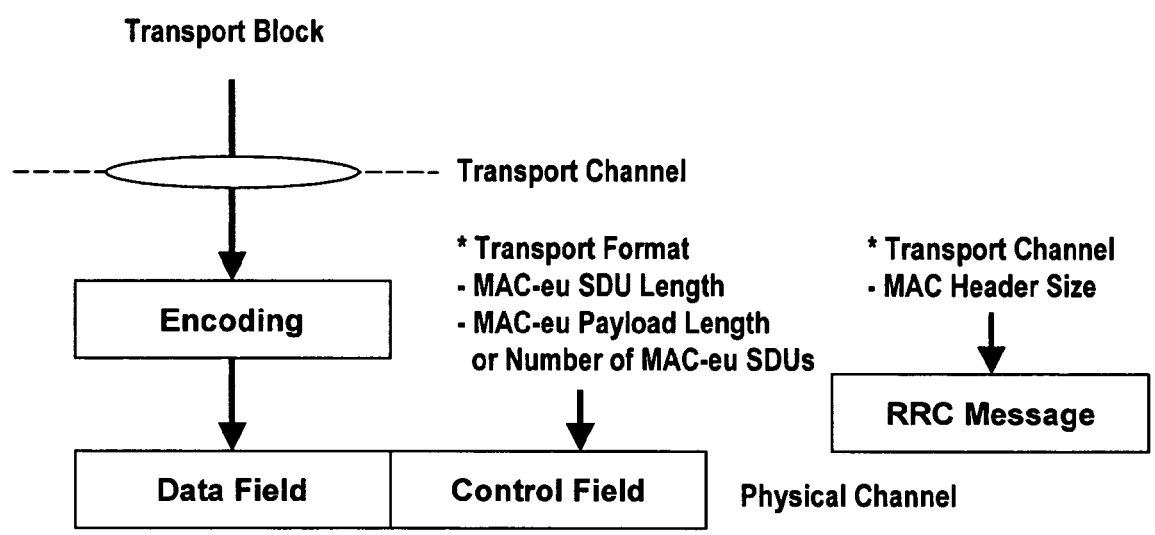
FIG. 9 depicts how a transport block is transmitted according to another embodiment of the present invention.
Figure 10A:
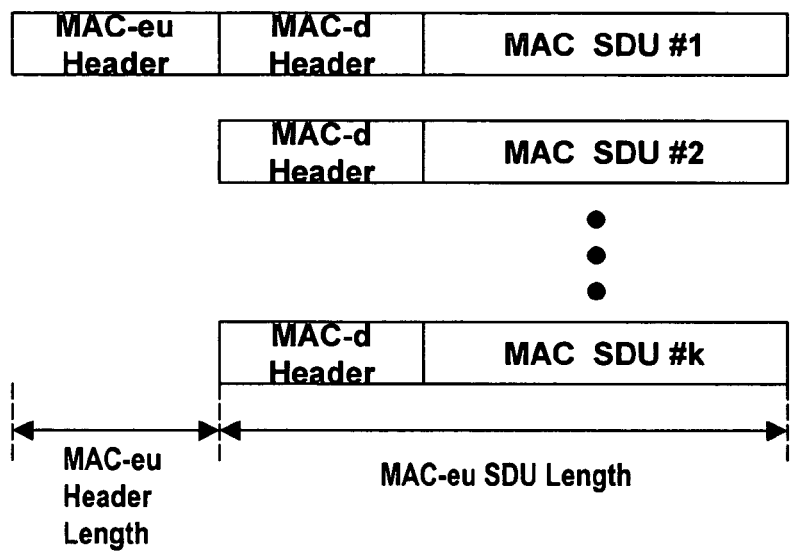
FIG. 10A depicts the MAC-eu header length and the MAC-eu SDU length according to another embodiment of the present invention.
Figure 10B:
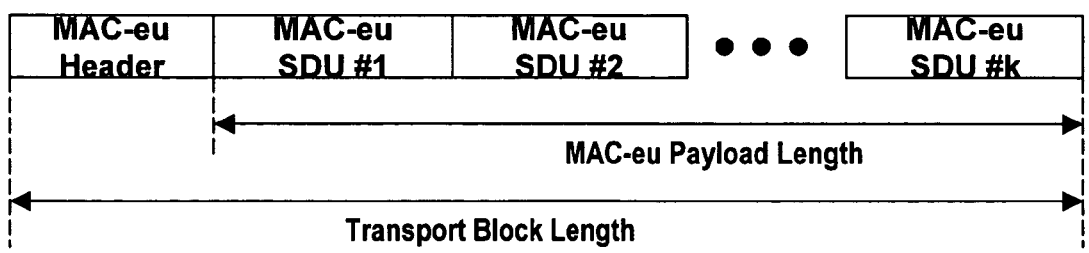
FIG. 10B depicts the MAC-eu payload length and the transport block length according to another embodiment of the present invention.

FIGS. 8 through 10B depicts a transmission method for E-DCH transport block size information according to another embodiment of the present invention. FIG. 8 depicts a protocol stack according to another embodiment of the present invention. Here, it is understood that such protocol stack exists in both a transmitting side and a receiving side to achieve the present invention. FIG. 9 depicts a method of transmitting transport block size information for a transport block transmitted during one TTI according to another embodiment of the present invention. FIG. 10A defines the MAC-eu header size and the MAC-eu SDU size according to another embodiment of the present invention. FIG. 10B defines the MAC-eu payload size and the transport block size according to another embodiment of the present invention.

As shown in FIG. 8, for the E-DCH, the MAC-eu entity is located below the MAC-d entity. The MAC-d entity delivers the MAC-eu SDU (having a MAC-d header attached to the MAC-d SDU received via the logical channel) to the MAC-eu entity, and the MAC-eu entity delivers the MAC PDU (having a MAC-eu header attached to the one or more MAC-eu SDUs) to the L1 (physical layer) entity via a transport channel.

As shown in FIG. 9, the transmitting side MAC-eu delivers, via a transport channel, the transport block to the receiving side physical layer, which performs encoding on the transport block and then delivers to the receiving side using the data field of the physical channel. Also, the transmitting side includes the transport block size information (consisting of MAC-eu SDU size, MAC-eu payload size, and MAC-eu header size) into the transport format (TF), and transmits to the receiving side. Here, the MAC-eu SDU size and the MAC-eu payload size are delivered to the receiving side by using the control field of the physical channel, while the MAC-eu header size is delivered to the receiving side by using the RRC message.

Here, the physical channel used for transmitting the MAC-eu SDU size, the MAC-eu payload size, and the MAC-eu header size may be the same or may be different from the physical channel used for transmitting the transport block. Also, the RRC message transmitting the MAC-eu header size can be the same or can be different from the channel used to transmit the transport block. All transmitting sides (e.g., all UTRANs) and all receiving sides (e.g., all UEs) that can support the present invention must always store and use the same MAC header size that was agreed upon in advance.

As shown in FIG. 10A, the MAC-eu header size refers to the MAC-eu header length (that is, the number of bits for the MAC-eu header) that includes control information attached by the corresponding MAC entity, while the MAC-eu SDU size refers to the length of the data unit (that is, the number of bits in the data unit) that was received from an upper layer of the corresponding MAC-eu entity. That is, the MAC-eu SDU size corresponds to the PDU length of the MAC-d entity. Examples of the control information contained in the MAC-eu header include HARQ related control information, such as a sequence number and a queue identifier.

As shown in FIG. 10B, the MAC-eu payload size refers to the sum of the lengths of the MAC-eu SDUs delivered in one TTI, and the transport block size refers to the sum of the MAC-eu payload size length and the MAC-eu header size length. If there is only one transport block delivered during one TTI, the transport block size and the transport block set size are the same.

According to the embodiments of the present invention, the receiving side receives the TF containing the MAC-eu SDU size, and the MAC-eu payload size, or the MAC-eu header size, and adds the MAC-eu payload size with the MAC-eu header size to calculate the transport block size or the transport block set size. The receiving size physical layer uses the transport block size or the transport block set size for decoding the received data, and after re-configuring the transport block, the re-configured transport block is delivered to the receiving side MAC-eu entity. The receiving side MAC-eu entity uses the MAC-eu header size and the MAC-eu SDU size to re-configure one or more MAC-eu SDUs, which are then delivered to an upper entity.

As described above, for solving the related art problems related to MAC header redundancy, the transport block transmission method according to the present invention divides the length of the transport block (to be transmitted from the transmitting side to the receiving side) into a header length and a length of the transport block excluding the header length, and transmits these via respectively different channels or respectively different messages.

Also, the header length included in the transport block is fixed, and the header length and the length of the transport block excluding the header length are transmitted with respectively different frequency (regularity). By employing the above methods, the present invention can achieve an improvement in data transmission efficiency, and can minimize the waste of radio resources.

Accordingly, the present invention provides a transmitting side for transmitting data blocks, comprising a MAC-d entity; and a MAC-eu entity in a MAC layer located below the MAC-d entity; the MAC-eu entity, receiving more than one data block from the MAC-d entity; attaching one header to the received data blocks; transmitting the data blocks with the header attached thereto during one transmission interval on a data channel; and further transmitting information about the size of each data block and the total size of the data blocks during a time interval corresponding to the transmission interval on a control channel.

Also, the present invention provides a receiving side for receiving data blocks, comprising: a physical (PHY) layer, and a MAC-eu entity in a MAC layer located above the PHY layer, the MAC-eu entity, receiving information about the size of a single header; receiving information about the size of each data block and the total size of data blocks transmitted during a time interval on a control channel; and further receiving data blocks and a single header for the data blocks, during one transmission interval corresponding to the time interval on a data channel according to the received information about the total size of the data blocks and the received information about the size of the single header.

To implement the above procedures, the present invention can employ various types of hardware and/or software components (modules). For example, different hardware modules may contain various circuits and components necessary to perform the steps of the above method. Also, different software modules (executed by processors and other hardware) may contain various codes and protocols necessary to perform the steps of the above method.

Namely, the present invention provides an apparatus to transmit data blocks, comprising: a receiving module to receive more than one data block; a processing module to attach one header to the received data blocks; and a transmitting module to transmit the data blocks with the header attached thereto during one transmission interval on a data channel, and to further transmit information about the size of each data block and the total size of the data blocks during a time interval corresponding to the transmission interval on a control channel.

Also, the present invention provides an apparatus to receive data blocks, comprising: a first module to receive information about the size of a single header; a second module to receive information about the size of each data block and the total size of data blocks transmitted during a time interval on a control channel; and a third module to further receive data blocks with a single header attached thereto, during one transmission interval corresponding to the time interval on a data channel according to the received information about the total size of the data blocks and the received information about the size of the single header. The apparatus to receive data blocks, further comprising: a processing module to remove the single header from the data blocks according to the received information about the size of the header; and a disassembling module to disassemble the data blocks extracting the single header according to the received information about the size of each data block.

Preferably, the modules are part of a MAC entity, such as a MAC-eu entity or the modules are part of a mobile station, a wireless handset, a network, a base station, a Node B or a RNC (radio network controller).

This specification describes a various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A method of transmitting medium access control (MAC) service data units (SDUs) by a MAC entity in a mobile communications system, the method comprising:
    receiving a plurality of MAC SDUs associated with a MAC header;
    attaching the MAC header to the plurality of MAC SDUs to form a transport block, wherein the plurality of MAC SDUs form a payload;
    transmitting the transport block on a data channel; and
    further transmitting information about size of one MAC SDU, and size of the payload or number of MAC SDUs in the payload, on a control channel,
    wherein information about size of the MAC header is not transmitted together with the information about the size of one MAC SDU, and the size of the payload or number of MAC SDUs in the payload.

2. The method of claim 1, wherein the data channel and the control channel are time multiplexed onto the same physical channel.

3. The method of claim 1, wherein the data channel and the control channel are code multiplexed.

4. The method of claim 1, wherein the size of each MAC SDU transmitted during a transmission time interval (TTI) on the data channel is the same.

5. The method of claim 1, wherein the MAC header is a MAC-eu header.

6. The method of claim 1, wherein the data channel is an enhanced dedicated channel (E-DCH).

7. The method of claim 1, wherein information about the size of the MAC header is transmitted by using a radio resource control (RRC) message.

8. The method of claim 2, wherein information about the size of one MAC SDU and the size of payload or the number of MAC SDUs in the payload is transmitted by using a control field of the physical channel.

9. A method of receiving medium access control (MAC) service data units (SDUs) by a MAC entity in a mobile communications system, the method comprising:
    receiving information about size of a MAC header for a transport block comprising a plurality of MAC SDUs and the MAC header, wherein the MAC header is associated with the plurality of MAC SDUs, wherein the plurality of MAC SDUs form a payload;
    receiving information about size of one MAC SDU, and size of the payload or number of MAC SDUs in the payload on a control channel; and
    receiving the transport block, on a data channel, wherein information about size of the MAC header is not received together with the information about the size of one MAC SDU, and the size of the payload or number of MAC SDUs in the payload.

10. The method of claim 9, further comprising:
    removing the MAC header from the transport block according to the received information about the size of the MAC header; and
    disassembling the plurality of MAC SDUs according to the received information about the size of one MAC SDU.

11. The method of claim 10, wherein the removing and disassembling is performed at the MAC entity.

12. The method of claim 9, wherein the data channel and the control channel are time multiplexed onto the same physical channel.

13. The method of claim 9, wherein the data channel and the control channel are code multiplexed.

14. The method of claim 9, wherein the size of each MAC SDU received during a transmission time interval (TTI) on the data channel is the same.

15. The method of claim 9, wherein the MAC header is a MAC-eu header.

16. The method of claim 9, wherein the data channel is an enhanced dedicated channel (E-DCH).

17. The method of claim 9, wherein information about the size of the MAC header is received by using a radio resource control (RRC) message.

18. The method of claim 12, wherein information about the size of one MAC SDU, and the size of the payload or the number of MAC SDUs in the payload is received by using a control field of the physical channel.

* * * * *